United States Patent [19]
Towns

[11] Patent Number: 5,980,811
[45] Date of Patent: Nov. 9, 1999

[54] METHOD OF MOLDING A CONTAINER FINISH

[76] Inventor: Edward J. Towns, 14301 Hackamore Dr, Matthews, N.C. 28105

[21] Appl. No.: 08/313,901

[22] Filed: Sep. 28, 1994

[51] Int. Cl.⁶ .................................................. B29C 45/37
[52] U.S. Cl. ...................... 264/328.1; 425/330; 425/577; 249/144
[58] Field of Search ................................ 264/328.1, 318; 425/556, 330, 542, DIG. 58, 577; 249/144, 117

[56] References Cited

U.S. PATENT DOCUMENTS

| | | | |
|---|---|---|---|
| 3,556,338 | 1/1971 | Wilkinson | 215/320 |
| 3,592,349 | 7/1971 | Baugh | 215/354 |
| 4,201,360 | 5/1980 | Schwartzburg et al. | 425/DIG. 58 |
| 4,881,891 | 11/1989 | Luther | 425/DIG. 58 |
| 5,033,777 | 7/1991 | Blenkush | 285/317 |
| 5,167,898 | 12/1992 | Luther | 425/DIG. 58 |
| 5,183,615 | 2/1993 | Zushi | 425/DIG. 58 |

*Primary Examiner*—Jill L. Heitbrink
*Attorney, Agent, or Firm*—Charles E. Temko

[57] ABSTRACT

An improved method of molding a container finish for containers containing liquid at or above atmospheric pressures in which the frusto-conical sealing area thereof is formed in substantially unflawed condition. To accomplish this, the mold for the container includes the usual upper and lower members which move axially when the mold is opened, which members mate with a pair of side members which move laterally when the mold is opened. However, as contrasted with prior art molds of this type, the upper mold member is provided with an axially oriented cavity which encloses that portion of the neck finish which includes the sealing surface to a degree wherein the laterally extending parting line at the upper end of the side members is positioned below the lower edge of the frusto-conical sealing surface thus eliminating the presence of either axially oriented or transversely oriented parting lines on the sealing surface itself.

1 Claim, 2 Drawing Sheets

METHOD OF MOLDING A CONTAINER FINISH

BACKGROUND OF THE INVENTION

This invention relates generally to the field of closures for containers containing liquid at or above-atmospheric pressures such as containers for carbonated soft drinks, and the like, as well as non-carbonated fruit drinks, and more particularly, to an improved method for molding containers, the finish of which includes a frusto-conical sealing area the top end of the finish.

In my copending application Ser. No. 07/848,228 filed Mar. 9, 1992, there is disclosed a bottle finish of this type incorporating a frusto-conical sealing area adjacent the open mouth of the finish. This form of closure has proven to be very effective, and capable of withstanding internal pressures within the container in the order of 150 pounds per square inch, approximately three times the above internal pressures normally encountered during contemplated use.

However, such closures do require sealing surfaces which mate accurately on the closure and the finish of the container, which are substantially free of flaws which form potential sources of leakage. Particularly in the case of containers which are formed of molded glass, and in which commercial tolerances are relatively large, it has been found that leakage can occur if the sealing surface on the container finish has even the slightest flaw, due to the relative inflexibility or substantial resiliency of such surfaces.

In the case of containers or bottles formed from synthetic resinous materials, the problem relative to commercial tolerances is not as critical as with containers formed from glass. However, such containers are usually blow molded using a blank that has been previously formed as an injection molding, including the frusto-conical sealing surface at the finish portion thereof. Any flaw in such sealing surface is not normally corrected during the blow molding process.

In the case of glass containers, they are normally formed by injection molding in a multi-part mold. As is the case with synthetic resinous containers, the aligned edges of the mold parts are seldom perfectly fitting, so that the molded product usually has, on the outer surface thereof raised lines corresponding to each of the parting lines on the mold. When such lines extend into the frusto-conical sealing surface, the corresponding sealing surface on the closure is unable to form a complete seal, with resultant leakage occurring.

Glass containers do have a substantial advantage over synthetic resinous containers used in the soft drink and beer marketing areas. While synthetic resinous containers can and frequently are recycled, glass containers are inherently more sturdy and can be refilled for reuse as well. With repeated use, the outer peripheries of the containers are invariably subject to rubbing contact with similar containers resulting in a degree of abrasion which is usually harmless from the standpoint of appearance. However, containers of this type which incorporate the above-described frusto-conical sealing surface can incur damage in the sealing area during usual cleansing and refilling procedures which is not easily visually detected, but which, nevertheless, results in a recycled container which is no longer capable of maintaining an adequate seal with a corresponding cap applied after the container is refilled.

SUMMARY OF THE INVENTION

Briefly stated, the invention contemplates the provision of an improved molding method and accompanying mold construction in which the above-mentioned problem is substantially eliminated. To this end, the mold for the container includes the usual upper and lower members which move axially when the mold is opened, which members mate with a pair of side members which move laterally when the mold is opened. However, as compared with prior art molds of this type, the upper mold member is provided with an axially oriented cavity which encloses that portion of the neck finish which includes the frusto-conical sealing surface to a degree wherein the laterally extending parting line at the upper end of the side members is positioned below the lower edge of the frusto-conical sealing surface, thus eliminating the presence of either axially oriented or transversely oriented parting lines on the sealing surface itself. Any imperfections developed during use may be thus corrected by repairing or replacing only the upper mold member.

The second-mentioned problem, that of protecting the frusto-conical sealing surface from damage during recycling, is also resolved by the present invention. To facilitate handling of the container during the filling thereof, it is common to provide a so-called transfer ring which enables the container to be moved from a conveyor belt during the capping or closing of the container. It has been determined that by forming the transfer ring on the container finish to be of sufficiently large diameter, it also serves the purpose of preventing contact of the frusto-conical sealing area with another surface which might damage the sealing area.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
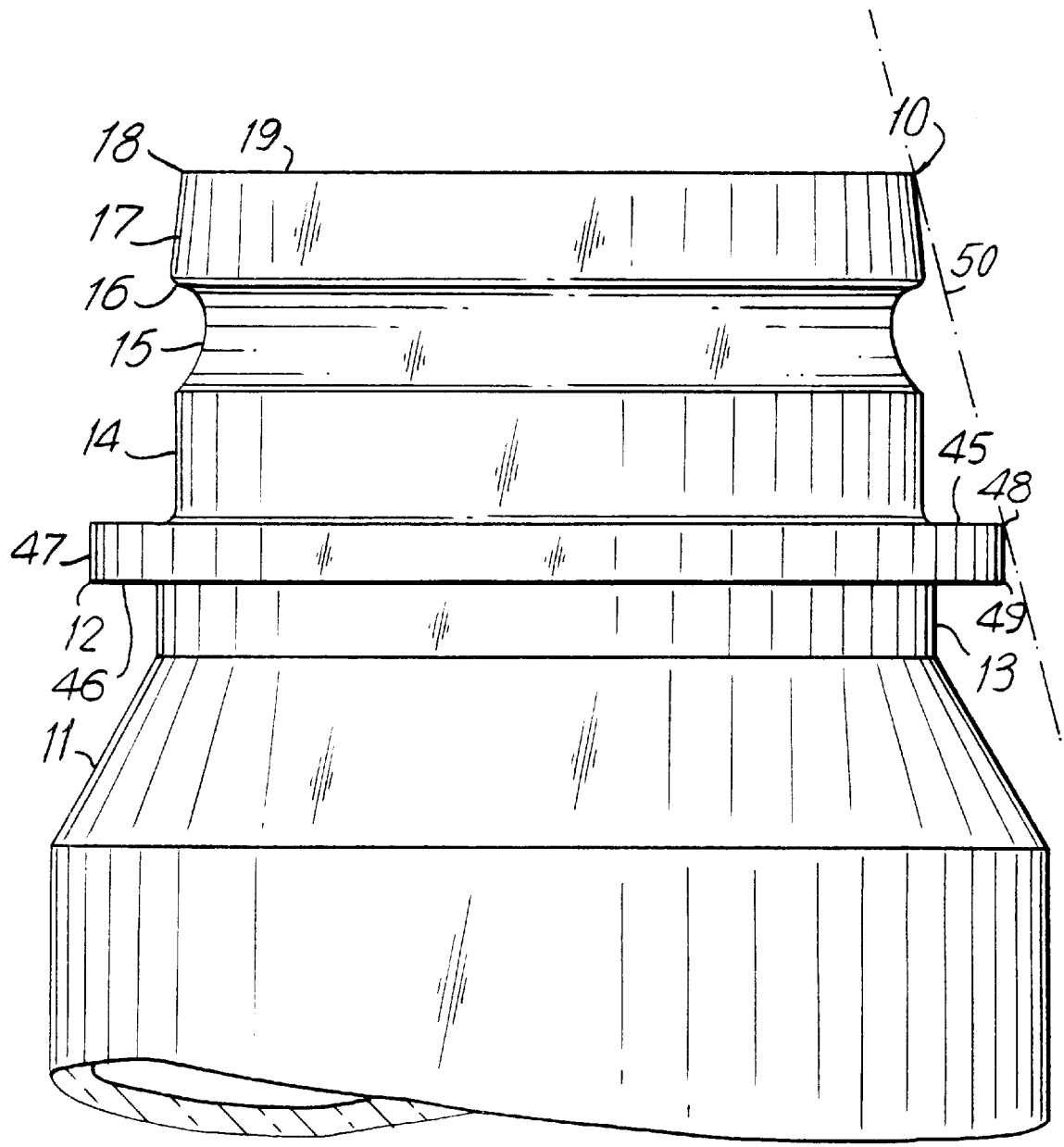
FIG. 1 is a fragmentary schematic side elevational view of a container finish formed in accordance with the present invention.

In accordance with the invention, FIG. 1 illustrates a container finish 10 having a tapered neck portion 11 including a known transfer ring 12 positioned above a cylindrical portion 13 at the end of the bottle finish. Disposed above the transfer ring 12 is an upper cylindrical portion 14 including a bead retaining recess 15. An arcuate surface 16 interconnects with a frusto-conical sealing surface 17 described in my above-mentioned copending application, which surface terminates at an annular edge 18 where it joins an upper generally planar end surface 19.

Figure 2:
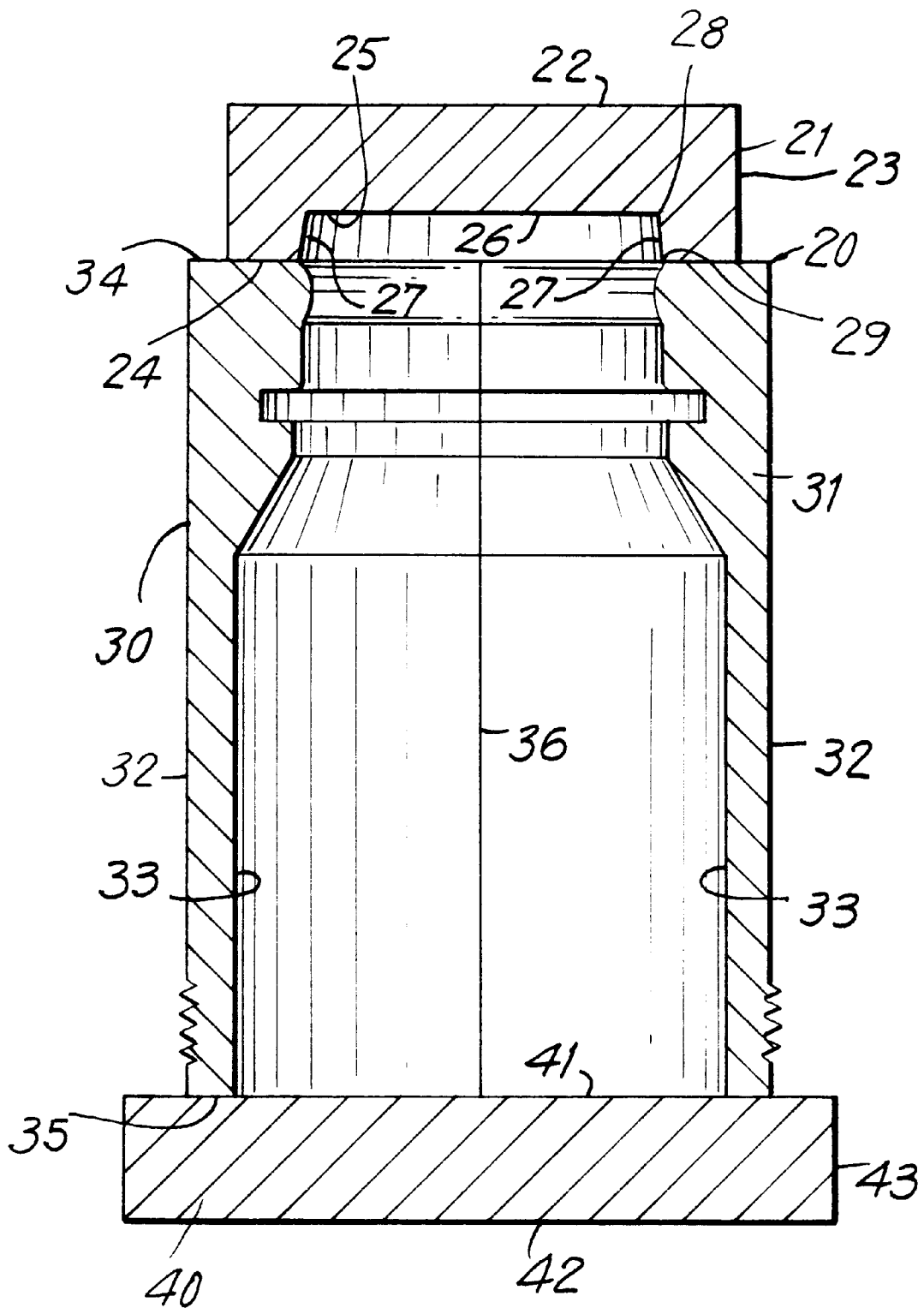
FIG. 2 is a fragmentary schematic vertical central sectional view of a container mold in accordance with the invention.

FIG. 2 illustrates an injection mold 20 in accordance with the invention, which mold includes a first upper member 21, bounded by a planar end surface 22, an annular side surface 23, and a planar inner surface 24. Extending upwardly from the surface 24 is a centrally disposed frusto-conical recess 25 bounded by an end surface 26 and a frusto-conical side surface 27 bounded by first and second annular edges 28 and 29.

The mold also includes first and second side members 30 and 31 which are similar and symmetrical, each including an outer surface 32, a contoured inner surface 33, an upper end surface 34 and a lower end surface 35.

At a lower end of the mold is a second end member 40 bounded by an upper surface 41, a lower surface 42, and a peripheral surface 43.

When the above-described mold members are in a mutually engaged condition prior to the injection of a molding material, each of the above surfaces will normally form an indication of a parting line on the molded article, as is well known in the art. In the conventional soft drink container, there will be at least first and second vertical parting lines, one of which is indicated by reference character 36 which will normally extend the entire axial length of the container. While the presence of such lines is not objectionable where the container is closed using a conventional crown-type seal, in which the sealing areas are transversely extending at the mouth of the container, the presence of such a parting line which extends over the length of the frusto-conical sealing surface contemplated by the present invention would invariably give rise to a flawed area which would permit the leakage of gas once the container has been closed. This problem will normally be more serious in the case of a glass container, but is substantial even when the container is made of synthetic resinous materials.

In accordance with the present invention, by providing a recess in the first end member which forms the entire frusto-conical sealing area, it is possible to confine the indications of parting lines on the molded article entirely inwardly of the mouth portion of the container finish, wherein only a smooth, substantially perfect frusto-conical surface is formed which accurately mates with the corresponding frusto-conical surface on the closure.

The mold is opened and closed in a conventional manner. During the opening of the mold after the molding operation, the upper member is first moved axially upward to uncover the sealing surface, following which the side members are opened, permitting removal of the molded article.

Referring to FIG. 1, the transfer ring 12 is bounded by an upper surface 45, a lower surface 46, and a peripheral arcuate surface 47 meeting surfaces 45 and 46 at edges 48 and 49. Reference character 50 designates a dashed line which lies tangent to edge 48 and edge 18 at the upper end of the frusto-conical sealing area 17. It may be observed that the entire area 17 is out of contact with the line. Thus, where the container is tumbled or otherwise moved against another container during processing for reuse, the likelihood of the surface 17 contacting another surface on such other container is substantially reduced if not completely eliminated, depending, of course, upon the particular outer shape of the containers involved. It has been determined that where the container is of classic "coke-shaped" design, for example, there are no convex surfaces on the container which can enter the space between the edges 48 and 18 inside of the line 50. Thus, by forming the transfer ring of sufficiently large diameter, there is provided a simply expedient means for protecting the frusto-conical sealing surface 17 during normal use and recycling.

It is to be noted that where the same mold is to be used for forming frusto-conical sealing surfaces of differing angularity, it is possible to change the frusto-conical angle by merely substituting the upper end member 21 which includes a recess having frusto-conical surfaces of desired angle.

In a somewhat analogous fashion, it is possible to alter the contour of the arcuate surface 16 adjacent the sealing surface 17 for the purpose of varying the degree of resistive force which must be overcome to dislodge a closure from the finish by suitable replacement members (not shown) for the members 30 and 31. By altering the angle with respect to the vertical of the surface 16, the degree of purchase obtained by the beaded edge 60 of the closure 61 may be lowered requiring less force to dislodge the closure to open the container. This provision permits the use of the same closure in conjunction with containers for carbonated drinks requiring a relatively high degree of purchase to effect a gas tight seal, and containers for non-carbonated drinks, which require a substantially lower degree of purchase, permitting opening of the container without the use of an opening tool.

I wish it to be understood that I do not consider the invention to be limited to the precise details of structure shown and set forth in the specification, for obvious modifications will occur to those skilled in the art to which the invention pertains.

I claim:

1. In the process of molding a container having a finish at an open end thereof in which the end of the finish is provided with an end surface and a frusto-conical sealing area thereon, including the steps of providing a mold having at least three parts, including an end member and a pair of side members forming the end and side surfaces of said finish, said end and side members being positioned in abutted relation during a molding operation, forming an axially-extending recess in an inner surface of said end member corresponding to the end surface and said frusto-conical sealing area whereby all parting lines formed by said mold members during molding are positioned outside said frusto-conical sealing area, the improvement comprising the additional step of forming a transfer ring on said finish positioned below said frusto-conical sealing area of diameter sufficiently large such that a line tangent to a surface on said transfer ring and an upper edge of said frusto-conical sealing area does not contact the remaining area of said sealing surface disposed therebetween.

* * * * *